Patented Jan. 23, 1923.

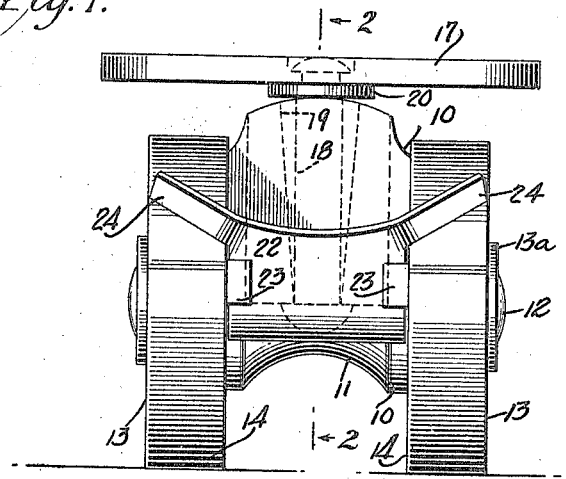
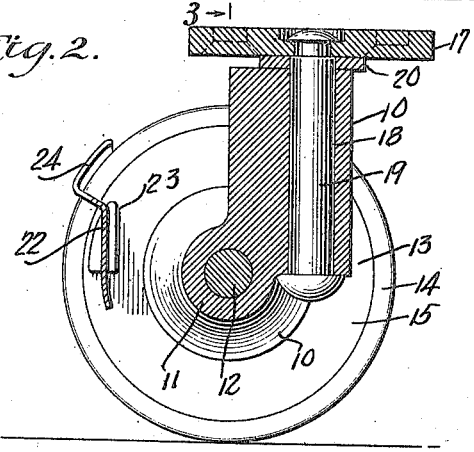
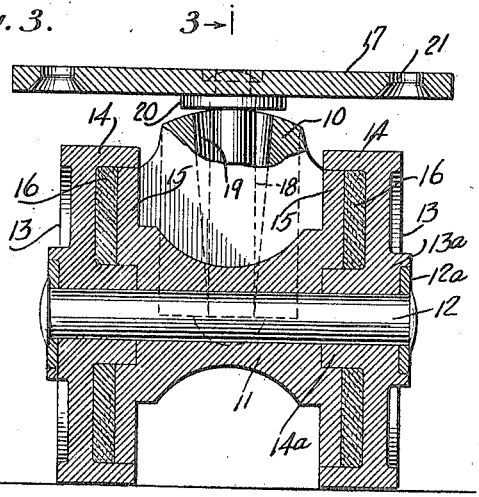

1,443,140

UNITED STATES PATENT OFFICE.

HOWARD CLARKE MILLER, OF BINGHAMTON, NEW YORK.

THREAD-GUARD CASTER.

Application filed December 16, 1921. Serial No. 522,803.

*To all whom it may concern:*

Be it known that I, HOWARD C. MILLER, a citizen of the United States, and a resident of Binghamton, in the county of Broome and State of New York, have invented a new and Improved Thread-Guard Caster, of which the following is a description.

My invention relates to a caster for use on trucks or racks in shoe factories, textile mills, and the like and particularly to a caster of the indicated class having guard means in which thread guards are embodied to prevent threads from winding on the wheels of the caster.

The general object of my invention is to provide an improved caster of the indicated type, whereby not only will threads be effectively prevented from winding in the wheels but the wheels and axle may have lateral tilting movement relatively to the truck or rack to conform to uneven floors.

The invention contemplates also a novel scraper for the caster.

The nature of the invention and its distinctive features and characteristics will clearly appear as the description proceeds.

Reference is to be had to the accompanying drawings forming a part of this specification, it being understood that the drawings are merely illustrative of one example of the invention.

Figure 1 is a front elevation of a caster embodying my invention;

Figure 2 is a vertical section thereof as indicated by the line 2—2, Figure 1;

Figure 3 is a vertical section at right angles to Figure 2 as indicated by the line 3—3 in Figure 2.

In carrying out my invention in accordance with the illustrated example a body 10 is provided having a horizontal bearing 11 for an axle 12 provided with wheels 13. The ends of the axle 12 are shown as riveted over washers 12$^a$ within annular flanges 13$^a$ formed on the webs of the wheels 14 at the outer sides of the latter. On each wheel at the inner side thereof is an annular flange 14 directed laterally inward and on the body 10 are formed flanges 15 accommodated within the flanges 14 of the wheels so that said flanges 15 close the wheels at the flanged side thereof and prevent the entrance of threads or other foreign matter. The hubs 14$^a$ of the wheel project at the inner sides thus forming a cup or annular channel at the inner side of each wheel between the hub 14$^a$ and the flange 14. Fitting in the channels or cups formed between the hubs 14$^a$ and flanges 14 are oil-soaked felt washers 16 to lie against the web of the wheel and fill the space between the web and the flange 15 of the body to prevent access of threads or particles from entering said space.

The caster includes a securing plate 17 at the top to which the body 10 is swiveled by a vertical pin 18 riveted to said plate and body. The pin 18 passes through a vertical pin hole 19 in the body 10 and in order that the caster wheels and axle and the body may tilt laterally and accommodate themselves to an uneven floor, the hole 19 is oval with the major axis of the oval transverse to the body, said hole tapering toward the lower end. Between the top of the body, 10, and the under side of the securing plate 17, a washer 20 is provided on the pin 18, said washer in practice being of bronze and being provided to reduce the friction between the body and the securing plate.

A scraper 22 is provided to remove threads or the like from the peripheries of the wheels 13, said scraper consisting of a plate received at its side edges in slotted lugs 23 on the flanges 15, the body having laterally and upwardly directed scraper arms 24 at opposite sides to lie in oblique positions against the peripheries of the wheels.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A caster wheel of the class described including a body having a pin hole of oval shape and tapering toward the lower end, said hole extending vertically through the body, the major axis of the oval being disposed transversely of the body, a securing plate at the top of said body, and a pin extending through said hole and held at its upper end to said top plate and having securing means at its lower end below the body.

2. A caster wheel of the class described including a body, an axle mounted in said body, and wheels on said axle at the sides of the body, said wheels each having a hub extending laterally inward at the side of the webs of the wheel, the wheels furthermore having annular flanges directed laterally inward at the inner sides, oiling washers fitting the hubs of the wheels and extending between the same and the said laterally directed flanges, the said body having radial annular flanges snugly received within said wheel flanges at the inside of said felt washers.

3. The combination with a caster of the class described and its wheels, of a scraper held to the caster between the wheels and presenting laterally scraper arms disposed obliquely against the peripheries of the wheels.

4. As a new article of manufacture, a scraper for a caster wheel consisting of a body adapted to be disposed between the wheels of the caster, and having oblique arms at the top extending in opposite directions at the sides of the scraper, the lower longitudinal edges of said arms constituting scraper edges.

HOWARD CLARKE MILLER.